(12) United States Patent
Feathergill

(10) Patent No.: US 8,046,550 B2
(45) Date of Patent: Oct. 25, 2011

(54) SYSTEMS AND METHODS FOR PERFORMING BACKUP OPERATIONS OF VIRTUAL MACHINE FILES

(75) Inventor: David Allen Feathergill, Woodstock, IL (US)

(73) Assignee: Quest Software, Inc., Aliso Viejo, CA (US)

( * ) Notice: Subject to any disclaimer, the term of this patent is extended or adjusted under 35 U.S.C. 154(b) by 418 days.

(21) Appl. No.: 12/182,364

(22) Filed: Jul. 30, 2008

(65) Prior Publication Data

US 2010/0011178 A1 Jan. 14, 2010

Related U.S. Application Data

(60) Provisional application No. 61/080,531, filed on Jul. 14, 2008.

(51) Int. Cl.
  *G06F 12/00* (2006.01)
  *G06F 13/00* (2006.01)
  *G06F 13/28* (2006.01)
  *G06F 9/455* (2006.01)

(52) U.S. Cl. ........................................ 711/162; 718/1

(58) Field of Classification Search ........... 711/161–162
See application file for complete search history.

(56) References Cited

U.S. PATENT DOCUMENTS

| | | |
|---|---|---|
| 4,130,867 A | 12/1978 | Bachman et al. |
| 4,648,031 A | 3/1987 | Jenner |
| 4,665,520 A | 5/1987 | Strom et al. |
| 5,222,235 A | 6/1993 | Hintz et al. |
| 5,297,279 A | 3/1994 | Bannon et al. |
| 5,325,505 A | 6/1994 | Hoffecker et al. |
| 5,333,314 A | 7/1994 | Masai et al. |
| 5,414,650 A | 5/1995 | Hekhuis |
| 5,422,979 A | 6/1995 | Eichfeld et al. |
| 5,423,037 A | 6/1995 | Hvasshovd |
| 5,455,945 A | 10/1995 | VanderDrift |
| 5,530,855 A | 6/1996 | Satoh et al. |
| 5,551,020 A | 8/1996 | Flax et al. |
| 5,553,303 A | 9/1996 | Hayashi et al. |
| 5,596,504 A | 1/1997 | Tata et al. |

(Continued)

OTHER PUBLICATIONS

Harley Stagner, "Aligning disk partitions to boost virtual machine performance", Vmware Management, Migration and Performance, http://searchvmware.techtarget.com/tip/0,289483,sid179_gci1344730_mem1,00.html, Jan. 28, 2009, pp. 1-5.

(Continued)

*Primary Examiner* — Yaima Campos
(74) *Attorney, Agent, or Firm* — Knobbe, Martens, Olson & Bear, LLP

(57) ABSTRACT

Backup systems and methods are disclosed for a virtual computing environment. Certain examples include a system having a backup management server that communicates with a host server having at least one virtual machine. The management server coordinates with the host server to perform backup copies of entire virtual machine disks from outside the guest operating system of the virtual machine. In certain examples, such backup systems further utilize a volume shadow copy service executing on the host server to quiesce virtual machine applications to put data in a consistent state to be backed up. The backup system then utilizes hypervisor snapshot capabilities of the host server to record intended changes to the virtual machine disk files while such files are being copied (e.g., backed up) by the host server. Such recorded changes can be later committed to the virtual machine disk files once the backup operation has completed.

19 Claims, 6 Drawing Sheets

U.S. PATENT DOCUMENTS

| | | | |
|---|---|---|---|
| 5,596,747 | A | 1/1997 | Katabami et al. |
| 5,634,052 | A | 5/1997 | Morris |
| 5,640,561 | A | 6/1997 | Satoh et al. |
| 5,655,081 | A | 8/1997 | Bonnell et al. |
| 5,721,915 | A | 2/1998 | Sockut et al. |
| 5,758,356 | A | 5/1998 | Hara et al. |
| 5,761,667 | A | 6/1998 | Koeppen |
| 5,761,677 | A | 6/1998 | Senator et al. |
| 5,774,717 | A | 6/1998 | Porcaro |
| 5,778,377 | A | 7/1998 | Marlin et al. |
| 5,778,392 | A | 7/1998 | Stockman et al. |
| 5,796,934 | A | 8/1998 | Bhanot et al. |
| 5,799,322 | A | 8/1998 | Mosher, Jr. |
| 5,822,780 | A | 10/1998 | Schutzman |
| 5,848,416 | A | 12/1998 | Tikkanen |
| 5,893,924 | A | 4/1999 | Bahis et al. |
| 5,933,818 | A | 8/1999 | Kasravi et al. |
| 5,933,820 | A | 8/1999 | Beier et al. |
| 5,940,832 | A | 8/1999 | Hamada et al. |
| 5,943,677 | A | 8/1999 | Hicks |
| 5,948,108 | A | 9/1999 | Lu et al. |
| 5,951,694 | A | 9/1999 | Choquier et al. |
| 5,951,695 | A | 9/1999 | Kolovson |
| 5,956,489 | A | 9/1999 | San Andres et al. |
| 5,956,504 | A | 9/1999 | Jagadish et al. |
| 5,978,594 | A | 11/1999 | Bonnell et al. |
| 5,983,239 | A | 11/1999 | Cannon |
| 5,991,761 | A | 11/1999 | Mahoney et al. |
| 5,995,958 | A | 11/1999 | Xu |
| 6,003,022 | A | 12/1999 | Eberhard et al. |
| 6,016,497 | A | 1/2000 | Suver |
| 6,026,412 | A | 2/2000 | Sockut et al. |
| 6,029,195 | A | 2/2000 | Herz |
| 6,067,545 | A | 5/2000 | Wolff |
| 6,070,170 | A | 5/2000 | Friske et al. |
| 6,119,128 | A | 9/2000 | Courter et al. |
| 6,122,640 | A | 9/2000 | Pereira |
| 6,151,607 | A | 11/2000 | Lomet |
| 6,157,932 | A | 12/2000 | Klein et al. |
| 6,185,699 | B1 | 2/2001 | Haderle et al. |
| 6,243,715 | B1 | 6/2001 | Bogantz et al. |
| 6,253,212 | B1 | 6/2001 | Loaiza et al. |
| 6,289,357 | B1 | 9/2001 | Parker |
| 6,314,421 | B1 | 11/2001 | Sharnoff et al. |
| 6,343,296 | B1 | 1/2002 | Lakhamraju et al. |
| 6,363,387 | B1 | 3/2002 | Ponnekanti et al. |
| 6,411,964 | B1 | 6/2002 | Iyer et al. |
| 6,460,048 | B1 | 10/2002 | Teng et al. |
| 6,470,344 | B1 | 10/2002 | Kothuri et al. |
| 6,477,535 | B1 | 11/2002 | Mirzadeh |
| 6,499,039 | B1 | 12/2002 | Venkatesh et al. |
| 6,519,613 | B1 | 2/2003 | Friske et al. |
| 6,523,035 | B1 | 2/2003 | Fleming et al. |
| 6,584,474 | B1 | 6/2003 | Pereira |
| 6,606,626 | B1 | 8/2003 | Ponnekanti |
| 6,631,478 | B1 | 10/2003 | Wang et al. |
| 6,671,721 | B1 | 12/2003 | Branson et al. |
| 6,691,139 | B2 | 2/2004 | Ganesh et al. |
| 6,721,742 | B1 | 4/2004 | Uceda-Sosa et al. |
| 6,728,780 | B1 | 4/2004 | Hebert |
| 6,834,290 | B1 | 12/2004 | Pugh et al. |
| 6,859,889 | B2 | 2/2005 | Matsuura et al. |
| 6,907,512 | B2 | 6/2005 | Hill et al. |
| 6,950,834 | B2 | 9/2005 | Huras et al. |
| 6,959,441 | B2 | 10/2005 | Moore |
| 7,065,538 | B2 | 6/2006 | Aronoff et al. |
| 7,085,900 | B2 | 8/2006 | Inagaki et al. |
| 7,340,486 | B1 | 3/2008 | Chapman |
| 7,370,164 | B1* | 5/2008 | Nagarkar et al. ............. 711/162 |
| 7,447,854 | B1* | 11/2008 | Cannon ......................... 711/162 |
| 7,461,103 | B2 | 12/2008 | Aronoff et al. |
| 7,546,325 | B2 | 6/2009 | Kamei et al. |
| 7,610,331 | B1* | 10/2009 | Genske et al. ................ 709/202 |
| 7,707,185 | B1* | 4/2010 | Czezatke et al. ............. 707/649 |
| 7,752,487 | B1 | 7/2010 | Feeser et al. |
| 7,765,400 | B2 | 7/2010 | Costea et al. |
| 7,805,423 | B1 | 9/2010 | Romine et al. |
| 7,844,577 | B2 | 11/2010 | Becker et al. |
| 7,849,267 | B2 | 12/2010 | Lam et al. |
| 2004/0236803 | A1 | 11/2004 | Spiegeleer |
| 2005/0114614 | A1* | 5/2005 | Anderson et al. ............. 711/162 |
| 2007/0208918 | A1* | 9/2007 | Harbin et al. ................ 711/162 |
| 2007/0244938 | A1* | 10/2007 | Michael et al. .............. 707/204 |
| 2008/0082593 | A1 | 4/2008 | Komarov et al. |
| 2008/0250406 | A1* | 10/2008 | Carpenter et al. ................ 718/1 |
| 2009/0007100 | A1* | 1/2009 | Field et al. ......................... 718/1 |
| 2009/0089781 | A1* | 4/2009 | Shingai et al. .................... 718/1 |
| 2009/0216816 | A1* | 8/2009 | Basler et al. .................. 707/204 |
| 2009/0216970 | A1* | 8/2009 | Basler et al. .................. 711/162 |
| 2010/0049930 | A1 | 2/2010 | Pershin et al. |
| 2010/0070725 | A1 | 3/2010 | Prahlad et al. |
| 2010/0076934 | A1 | 3/2010 | Pershin et al. |
| 2010/0077165 | A1 | 3/2010 | Lu et al. |
| 2010/0262585 | A1 | 10/2010 | Rosikiewicz et al. |
| 2011/0047340 | A1 | 2/2011 | Olson et al. |

OTHER PUBLICATIONS

Jeff Graves, "Partition Alignment", ORCS Web Team Blog, http://www.orcsweb.com/blog, Sep. 14, 2009, pp. 1-2.

John Willemse, "VMware disk alignment VMDK settings and align at the 64k boundary blogSphere bug desktop enterprise microsoft server vist . . . ", PLANET LOTUS, http://planetlotus.org/profiles/john-willemse_49586, Apr. 30, 2009, pp. 1-5 (of 44).

Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.

VMware, "Recommendations for Aligning VMFS Partitions", VMware Infrastructure 3, VMware Performance Study, 2009, pp. 1-10.

VMware, Inc., "VMware Virtual Machine File System: Technical Overview and Best Practices", A VMware Technical White Paper, http://www.vmware.com/support/, Issue Version 1.0, 2007, pp. 1-19.

"Data Deduplication Deep Dive, How to Put Data Storage on a Diet", InfoWorld, Mar. 2010, in 5 pages.

"The What, How and Where of Deduplication", Spectra nTier with FalconStor Deduplication, Spectra Logic Corporation, May 2008, in 12 pages.

"Quest SharePlex for Oracle," Brochure, Quest Software, Inc., Nov. 1999, 4 pages.

Space Management and Reorganization: Challenges and Solutions, http://quest.com/whitepapers/space_manager_wp.doc, published on or around Dec. 21, 1999.

"Top Five Tips for Space Management and Reorganization," believed to be published after Jul. 21, 1998, in 2 pages.

Backup Critic, "File Versus Image Backups," retrieved from http://www.backuperitic.com/software-buyer/file-verus-image.html on May 4, 2010, in 3 pages.

Computer Associates, "Platinum OnlineReorg Technical Overview, OnlineReorg", http://platinum.com/products/custstor/tsreorg.htm, 5 pages downloaded on Nov. 30, 1999.

Computer Associates, "Platinum Tsreorg Automates Tablespace Reorganizations, Customer Story", http://platinum.com/products/custstor/tsreorg.htm, 2 pages downloaded on Nov. 30, 1999.

Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.

Computer Associates, "Rapid Reorg for DB2 for OS/390, Brochure", http://platinum.com/products/custstor/tsreorg.htm, 3 pages downloaded on Nov. 30, 1999.

Data Sheet: Data Protection, "Symantec NetBackup 7, The Symantec NetBackup Platform: Complete protection for your information-driven enterprise," Symantec Corporation, Dec. 2009, in 8 pages.

EMC Deduplication Frequently Asked Questions, http://www.datadomain.com/resources/faq.html, downloaded Jun. 7, 2011, 4 pages.

Jin, Keren et al.,"The Effectiveness of Deduplication on Virtual Machine Disk Images", SYSTOR 2009, May 2009, in 12 pages.

Joseph Pagano, paper on Microsoft Exchange Disaster Recovery Planning, document version 3.00, 1996, in 39 pages.

K. Loney, et al., "Oracle8i, DB Handbook," Oracle Press, 2000, p. 20.

Kleo Bare Metal Backup, Wikipedia, retrieved from http://en.wikipedia.org/wiki/Kleo_Bare_Metal_Backup on Apr. 14, 2010, in 3 pages.

L. Leverenz, et al., "Oracle8i Concepts," Oracle Corp., vol. 2, Release 8.1.5, 1999, p. 20-3.

Laverick, Mike, "VMware Esx 3.x Server and VirtualCenter 2.x (GA Build Eval) Service Console Guide," Document Ver. 1.2, RTFM Education, downloaded Dec. 17, 2008, in 73 pages.

Massiglia, Paul, "Block-Level Incremental Backup", VERITAS Software Corporation, Feb. 2000, in 13 pages.

Microsoft TechNet, Windows Server 2003, retrieved from http://technet.microsoft.com/en-us/library/cc706993(WS.10,printer).aspx on Aug. 3, 2011, in 6 pages.

MSDN, Overview of Processing a Backup Under VSS, retrieved from http://msdn.microsoft.com/en-us/library/aa384589(d=printer,v=VS.85).aspx on Aug. 3, 2011, in 5 pages.

Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.

Veeam Technology Overview, "The New Standard for Data Protection," Veeam Software, Apr. 2010, in 2 pages.

Veritas NetBackup for VMware Adminstrator's Guide, UNIX, Windows, and Linux, Release 6.5.4, Symantec Corporation, 2009, in 66 pages.

* cited by examiner

Flags and Options

| vRanger Backup Options | VirtualCenter Backup Options | |
|---|---|---|
| Backup Flags | | Command Switch |
| ☐ Backup only powered on VMs | | -onlyon |
| ☐ Do not check the free space for the destination | | -nospacecheck |
| ☐ Do not create an archive of the file(s) | | -nozip |
| ☐ Only send mail logs when a backup error occurs | | -mailonerror |
| ☒ Update the VM notes with the most recent backup results | | -vmnotes |
| ☒ Disable Guest Quiescing | | -noquiesce |
| ☒ Enable VSS —550 | | -vss |
| ☐ Enable vRanger enhanced write speeds | | -vzboost |

User Options

| OptionName | CommandSwitch | OptionValue |
|---|---|---|
| ▲ VirtualCenter Custom Attribute | -customattrib | |
| Backup Description | -description | |
| Mail Results To | -mailto | |
| Working Path (on source server) | -temp | |
| Archive Name | -zipname | [config]_[weeknum] |

*FIG. 5*

SYSTEMS AND METHODS FOR PERFORMING BACKUP OPERATIONS OF VIRTUAL MACHINE FILES

RELATED APPLICATION

This application claims the benefit of priority under 35 U.S.C. §119(e) of U.S. Provisional Patent Application No. 61/080,531, filed on Jul. 14, 2008, and entitled "Systems and Methods for Performing Storage Operations in a Virtual Computing Environment," the entirety of which is hereby incorporated herein by reference to be considered part of this specification.

BACKGROUND OF THE INVENTION

1. Field of the Invention

Embodiments of the invention relate to performing storage operations in a virtual environment and, in particular, to performing backup operations of one or more virtual machines.

2. Description of the Related Art

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. In particular, a virtualization layer, or hypervisor, allocates the computing resources of one or more host servers into one or more virtual machines and further provides for isolation between such virtual machines. In such a manner, the virtual machine is a representation of a physical machine by software.

Associated with each virtual machine is at least one virtual machine disk that is located in one or more files in a datastore. The virtual machine disk can be copied, moved, backed up, or the like, similar to a general data file. However, when a virtual machine is powered on, or executing on the host computer, the virtual machine disk is generally locked against access from outside the virtual machine. As a result, to perform a full backup of a virtual machine disk, certain conventional backup systems and methods require powering down the virtual machine prior to performing the backup operation.

To avoid the costly downtime in powering down a virtual machine, certain systems perform backup operations from inside the guest operating system of the virtual machine. This approach, however, also has significant drawbacks in that such backup copies, being performed from within the guest operating system, cannot capture a backup of the entire virtual machine.

SUMMARY OF THE INVENTION

Given the aforementioned issues and challenges, a need exists for systems and methods for performing backup operations in a virtual computing environment from outside a guest operating system. Moreover, there is a need for performing backup copies of virtual machine disks without powering down the respective virtual machine(s) while maintaining data consistency to provide a clean, consistent image when backing up a virtual machine from a hypervisor.

In view of the foregoing, certain embodiments of the invention disclosed herein provide a backup tool that allows for the performance of automated backups of virtual machines. In particular, certain embodiments of the invention provide systems and methods for the synchronization of shadow copy services with hypervisor, external snapshot capabilities to perform the backup of one or more virtual machines.

For instance, in certain embodiments of the invention, one or more of the above-described needs is satisfied through a backup system comprising a backup management server that communicates with a host server to perform backup copies of entire virtual machine disks from outside the guest operating system. In certain embodiments, such backup systems utilize a volume shadow copy service executing on the host server to quiesce virtual machine applications to put data in a consistent state to be backed up. The backup system then utilizes hypervisor snapshot capabilities of the host server to record intended changes to virtual machine disk files while such files are being copied (e.g., backed up) by the host server.

In certain embodiments of the invention, a method is disclosed for performing one or more storage operations in a virtual computing environment. The method comprises receiving a request to back up a virtual machine having a guest operating system and being associated with a host server. The method further comprises: instructing a shadow copy process to quiesce write requests by application(s) executing on the virtual machine and creating a hypervisor snapshot of a virtual machine disk file associated with the virtual machine, the virtual machine disk file being maintained in a datastore.

Following the creation of the hypervisor snapshot, write requests are resumed by the application(s) executing on the virtual machine, and the method records, with the hypervisor snapshot, changes intended to be made to the virtual machine disk file based on the resumed write requests. Moreover, the method includes creating a backup copy of the virtual machine disk file without powering down the virtual machine, the backup copy of the virtual machine disk file being created from outside the guest operating system. Following the creation of the backup copy, the method then commits the changes recorded with the hypervisor snapshot to the virtual machine disk file.

In certain embodiments, a system is disclosed for performing storage operations in a virtualized computing environment. The system comprises a host computer, a shadow copy module and a management module. The host computer includes a virtual machine having a guest operating system that accesses resources of the host computer through at least a hypervisor layer. The shadow copy module, which executes on the host computer, quiesces write requests of application(s) executing on the guest operating system of the virtual machine.

The management module is in network communication with the host computer and is configured to: (i) receive a request to perform a backup copy of virtual disk file(s) of the virtual machine; (ii) instruct the shadow copy module to quiesce the write requests of the application(s); (iii) instruct the hypervisor layer of the host computer to create a snapshot file of the virtual disk file(s) of the virtual machine, the snapshot file being configured to record changes intended to the virtual disk file(s) during copying of the virtual disk file(s); (iv) instruct the host computer to create a backup copy of the virtual disk file(s); and (v) instruct the host computer to commit to the virtual disk file(s) the changes recorded by the snapshot file during the creation of the backup copy and, thereafter, to allow write access to the virtual disk file(s) by the application(s) executing on the guest operating system.

In certain embodiments, a system is disclosed for performing storage operations in a virtualized computing environment. The system comprises means for hosting a virtual machine having a guest operating system that accesses resources of the hosting means through at least a hypervisor layer. The system further comprises means for quiescing write requests of application(s) executing on the guest operating system of the virtual machine.

Moreover, the system comprises means for managing a backup of virtual disk file(s) of the virtual machine, the managing means being further configured to: (i) receive a request to perform a backup copy of virtual disk file(s) of the virtual machine; (ii) instruct the quiescing means to quiesce the write requests of the application(s); (iii) instruct the hypervisor layer of the hosting means to create a snapshot file of the virtual disk file(s) of the virtual machine, the snapshot file being configured to record changes intended to the virtual disk file(s) during copying of the virtual disk file(s); (iv) instruct the hosting means to create a backup copy of the virtual disk file(s); and (v) instruct the hosting means to commit to the virtual disk file(s) the changes recorded by the snapshot file during the creation of the backup copy and, thereafter, to allow write access to the virtual disk file(s) by the application(s) executing on the guest operating system.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 5 illustrates an exemplary embodiment of a screen display of a backup option window usable with the backup systems of FIGS. 1 and 2.

DETAILED DESCRIPTION OF THE PREFERRED EMBODIMENTS

Certain embodiments of the invention disclosed herein provide for the automatic backup of virtual machines without powering down the virtual machines, thereby avoiding significant interruption of performance of the virtual machine. Moreover, certain embodiments of the invention advantageously utilize shadow copy services on a host system to pause virtual machine application writes in order to provide a transitionally consistent backup image of a virtual machine disk for a backup process executing from outside the guest operating system of the virtual machine.

For example, certain embodiments of the invention include a system comprising a backup management server that communicates with a host server to perform backup copies of entire virtual machine disks from outside the guest operating system. In certain embodiments, such backup systems utilize a volume shadow copy service executing on the host server to quiesce applications running on the virtual machine in order to put data into a consistent state. The backup system then utilizes external, hypervisor snapshot capabilities of the host server to record (and later commit) changes intended to the virtual machine disk files while such files are being backed up by the host server. In this manner, a backup of an entire virtual machine disk can be obtained without powering down the virtual machine.

The features of the systems and methods will now be described with reference to the drawings summarized above. Throughout the drawings, reference numbers are re-used to indicate correspondence between referenced elements. The drawings, associated descriptions, and specific implementations are provided to illustrate embodiments of the invention and not to limit the scope of the disclosure.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

Figure 1:
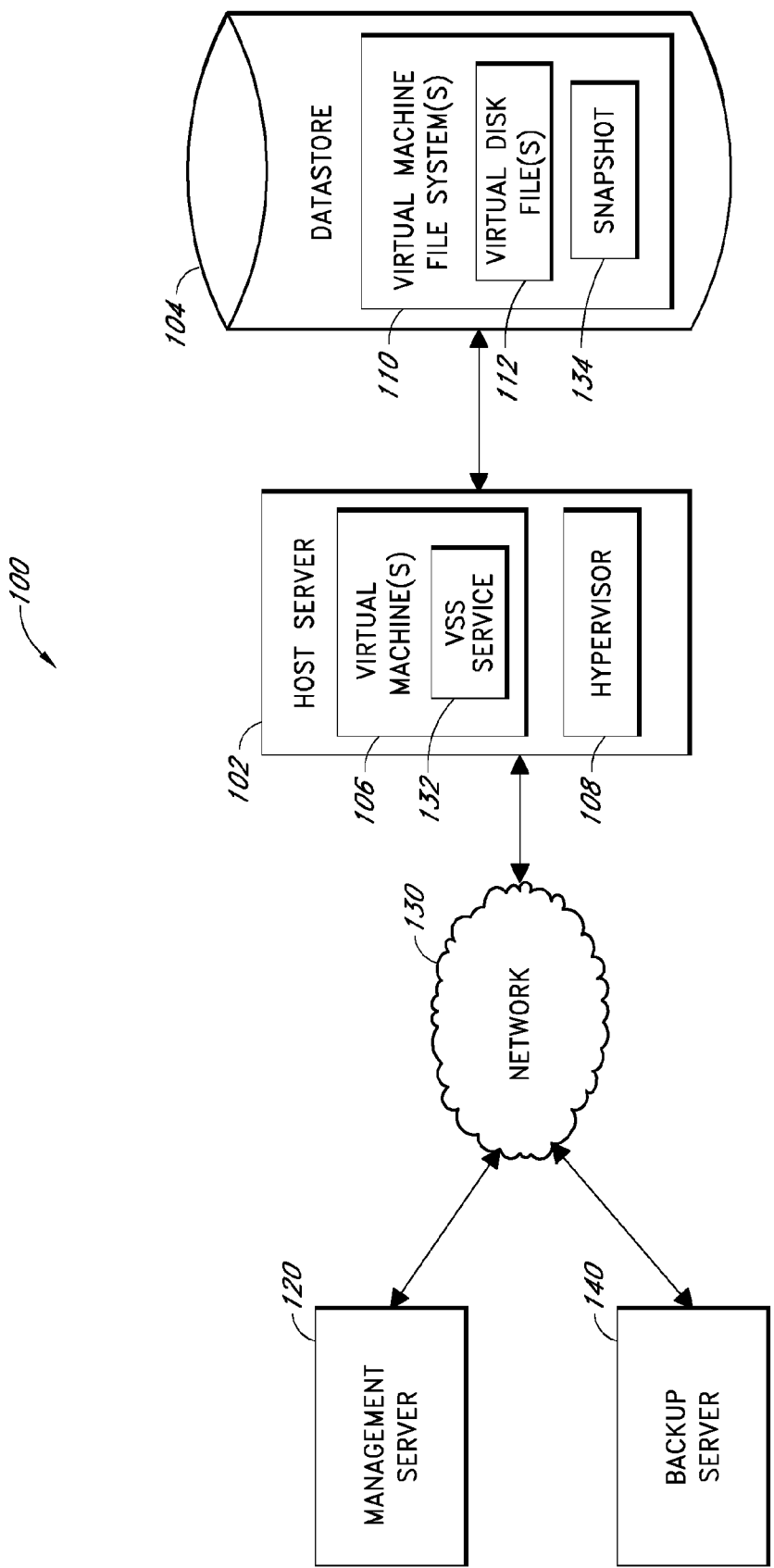
FIG. 1 illustrates an exemplary block diagram of a system for performing backup operations in a virtual computing environment, according to certain embodiments of the invention.

FIG. 1 illustrates a block diagram of a system 100 for performing backup operations in a virtual computing environment, according to certain embodiments of the invention. In general, the backup system 100 provides a tool for backing up entire virtual machine disk files while performing the backup operation from outside a guest operating system of the virtual machine. The tool further coordinates with a shadow copy service to quiesce applications on the virtual machine in order to obtain a transitionally consistent backup image. Moreover, in certain embodiments, the backup system 100 advantageously provides a hypervisor snapshot or like file structure for recording changes intended to the virtual machine disk files during performance of a backup operation, thereby allowing for the backup operation to take place without powering down the respective virtual machine.

As shown in FIG. 1, the backup system 100 includes a host server 102 in communication with a datastore 104. In certain embodiments, the host server 102 comprises one or more computing devices configured to host one or more virtual machines 106 executing on top of a hypervisor 108. In certain embodiments, the hypervisor 108 is configured to decouple the physical hardware of the host server 102 from the operating system(s) of the virtual machine(s) 106. Such abstraction allows, for example, for multiple virtual machines 106 with heterogeneous operating systems and applications to run in isolation on the same physical machine.

As discussed, the hypervisor 108 comprises a virtualization platform that allows for multiple operating systems to run on a host computer at the same time. For instance, the hypervisor 108 can comprise a thin piece of software that runs directly on top of the hardware platform of the host server 102 and virtualizes resources of the machine (e.g., a native or "bare-metal" hypervisor). In such embodiments, the virtual machine(s) 106 can run, with their respective operating systems, on the hypervisor 108 without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), or the like.

In yet other embodiments, the host server 102 can include a hosted architecture in which the hypervisor 108 runs within a host operating system environment. In such embodiments, the hypervisor 108 can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

The hypervisor 108, in certain embodiments of the invention, is capable of creating a snapshot of a virtual file system and/or one or more virtual disk files in order to record changes intended to such files during a certain period of time (e.g., during a backup operation).

In certain embodiments, each virtual machine 106 comprises an operating system and associated applications, which typically operate at a user-level. That is, in such embodiments, the virtual machine 106 accesses the resources (e.g., privileged resources) of the host server 202 through the hypervisor 108.

The host server 102 communicates with the datastore 104 to access data stored in one or more virtual machine files. For instance, the datastore 104 can comprise one or more virtual machine file systems 110 that maintain virtual disk files for each of the virtual machines 106 on the host server 102. In certain embodiments, the virtual machine file system 110 comprises a VMWARE VMFS cluster file system provided by VMware, Inc. In such embodiments, the VMFS cluster file system enables multiple host servers (e.g., with installations of ESX server) to have concurrent access to the same virtual machine storage and provides on-disk distributed locking to ensure that the same virtual machine is not powered on by multiple servers at the same time.

The datastore 104 can comprise any type of formatted logical container for holding virtual machine files and can exist on a physical storage resource, including one or more of the following: local disks (e.g., local small computer system interface (SCSI) disks of the host server 102), a disk array, a storage area network (SAN) (e.g., fiber channel), an iSCSI disk area, network attached storage (NAS) arrays, network file system (NFS), or the like. In certain embodiments, the virtual machine(s) 106 uses a virtual hard disk residing on the datastore 104 to store its operating system, program files and other data associated with its activities.

The backup system 100 further includes a management server 120 in communication with the host server 102 through a network 130. In certain embodiments, the management server 120 coordinates the backup operations of the virtual machine disk files 112 through the host server 102. In certain embodiments, the management server 120 can comprise any computing device capable of executing a backup tool, such as, for example, a WINDOWS-based server or the like, for performing the backup functions described herein.

In certain embodiments, and as discussed in more detail herein, the management server 120 coordinates with a volume shadow copy service (VSS) 132 installed on the virtual machine(s) 106 and/or host server 102, such as the VSS service offered by MICROSOFT, with the creation of a hypervisor snapshot 134 in backing up of one or more virtual disk files 112.

For example, the hypervisor 108 can be configured to create the snapshot 134 of a virtual file system 110 and/or one or more virtual disks in order to record changes intended to such data during a certain period of time (e.g., during a backup operation). In certain embodiments, after creating the snapshot 134, the hypervisor 108 then redirects and/or queues writes directed from applications on the virtual machine 106 to the virtual disk file(s) 112. At a subsequent time (e.g., when the backup process is complete), the intended changes are then committed to the virtual disk file(s) 112. Moreover, because the hypervisor 108 coordinates the snapshot functions from outside the guest operating system of the virtual machine 106, a complete and consistent image of the virtual disk is able to be obtained without powering down the virtual machine 106.

As further illustrated in FIG. 1, the backup system 100 includes a backup, or target, server 140 for storing backup files, such as a backup of one or more of the virtual disk files 112. As shown, the backup server 140 is coupled to the network 130 and can directly communicate therethrough with the management server 120. In certain embodiments, the backup server 140 comprises a WINDOWS-based backup server. In yet other embodiments, the backup server 140 can comprise a LINUX-based server, an ESX server, combinations of the same or the like.

As shown, the network 130 provides a wired and/or wireless communication medium between the host server 102, the management server 120 and/or the backup server 140. In certain embodiments the network 130 can comprise a local area network (LAN). In yet other embodiments, the network can comprise one or more of the following: internet, intranet, wide area network (WAN), public network, combinations of the same or the like. In addition, connectivity to the network 130 may be through, for example, remote modem, Ethernet, token ring, fiber distributed datalink interface (FDDI), asynchronous transfer mode (ATM), combinations of the same or the like.

Although the backup system 100 has been described with reference to particular arrangements, other embodiments of the invention can comprise more or fewer components. For example, in certain embodiments, the backup system 100 can function without the backup server 140, and backup files can be stored to the datastore 104 or a local storage device directly coupled to the management server 120 or host system 102.

In yet other embodiments, the host server 102 can comprise a plurality of servers in a clustered arrangement such that the computing and memory resources of the clustered servers are shared by one or more virtual machines 106. Moreover, in certain embodiments, a portion or all of the backup tool maintained by the management server 120 can reside on the host server 102 and/or the backup server 140.

Figure 2:
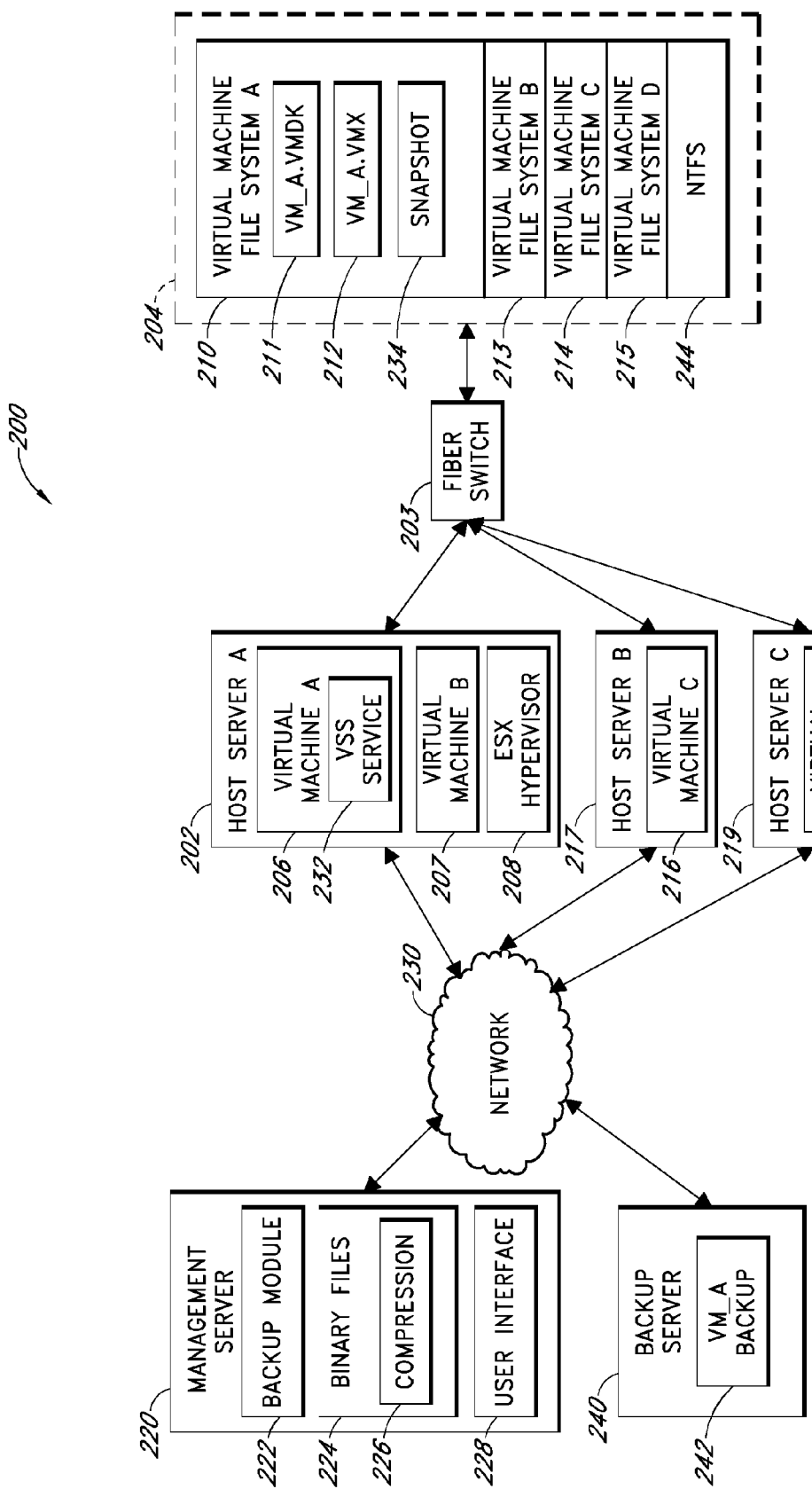
FIG. 2 illustrates an exemplary block diagram of another system for performing backup operations in a virtual computing environment, according to certain embodiments of the invention.

FIG. 2 illustrates a block diagram of another embodiment of a backup system 200 for performing storage operations in a virtual computing environment. In certain embodiments, the backup system 200 comprises similar components and/or performs similar functions as the backup system 100 of FIG. 1. In particular, the backup system 200 illustrates an embodiment of the invention in which backup functions can be performed on one or more virtual machines in an environment having a plurality of host servers in communication with a datastore.

As shown, the backup system 200 comprises a host server A 202 that communicates through a fiber switch 203 with a datastore 204. In particular, the host server 202 includes a virtual machine A 206 and a virtual machine B 207 running on a hypervisor 208, such as the VMware ESX hypervisor.

In certain embodiments, the datastore 204 comprises a SAN or like shared storage network that includes a plurality of virtual machine file systems storing data for a plurality of virtual machines executing on a plurality of host servers. In particular, a VMFS A 210 stores data related to the virtual machine 206 executing on the host server 202.

The VMFS 210 further includes a plurality of files related to the virtual machine 206. A VM_A.VMDK file 211 includes the virtual hard drive for the virtual machine 206. In certain embodiments, most of a .VMDK file's content comprises the data of the virtual machine, while a small portion is allotted to overhead of the virtual machine. If the virtual machine is connected directly to a physical disk, rather than to a virtual disk, the .VMDK file can also store information about the partitions the particular virtual machine is allowed to access.

In certain embodiments, the VM_A.VMDK file 211 can be a dynamic virtual disk in which the disk grows as the disk inside the guest operating system of the virtual machine 206 grows. In yet other embodiments, the VM_A.VMDK file 211 can comprise a fixed size virtual disk. In certain embodiments of the invention, the virtual disk of a single virtual machine can comprise multiple .VMDK files. For instance, an administrator or other user can specify a maximum size of each .VMDK file (e.g., 2 GB chunks). In such embodiments, the number of .VMDK files depends on the size of the virtual disk.

The datastore 204 also comprises a VM_A.VMX file, which includes configuration data for the virtual machine 206. The datastore 204 further includes additional virtual machine file systems, including VMFS B 213, VMFS C 214 and VMFS D 215. In particular, the VMFS 213 stores virtual machine files related to the virtual machine 207 on the host server 202. The VMFS 214 stores virtual machine files related to a virtual machine C 216 on a host server B 217. The VMFS D 215 stores virtual machine files related to a virtual machine D 218 on a host server D 219.

Moreover, in certain embodiments, either or both of the host servers 216 and 217 can comprise an ESX server or other like virtualization platform, such as those described above, for running their respective virtual machines.

FIG. 2 further illustrates a management server 220 in communication with the host servers 202, 217 and 219 through a network 230. In particular, the management server 220 comprises a backup module 222 that coordinates the automated backup of one or more virtual machines, such as the virtual machines 206, 207, 216 and 218. Furthermore, in certain embodiments, the backup module 222 is further capable of restoring backed-up virtual machines in the event of a disk failure or the like or if a user desires to revert to a previous version of a particular virtual machine.

In certain embodiments, the backup module 222 comprises the VRANGER PRO software tool available from Vizioncore, Inc. (Buffalo Grove, Ill.). For instance, the backup module 222 can execute on a WINDOWS-based server to perform automated backup of virtual machines running in the VMware ESX server environment. In yet other embodiments, all or a portion of the backup module 222 can be executed on one or more host servers.

The management server 220 further includes one or more binary files 224. In certain embodiments, the binary files 224 can be injected into the host server 202 to perform one or more functions relating to the backup of one or more virtual machine files. For instance, the binary files 224 comprise a compression binary file 226 that can be used to inject a compression engine into the host server 202 for compressing a backup file prior to transmitting the backup file to storage.

The management server 220 further includes a user interface module 228 for displaying to, and/or receiving from, a user information relating to operation of the management server 220. In certain embodiments, the user interface module 228 causes the display of one or more windows for obtaining user input and/or outputting status information with respect to the virtual environment.

In certain embodiments, in preparation for performing a backup operation of the virtual machine 206, the backup module 222 of the management server 220 is configured to initiate a VSS service 232 on the host server 202 to temporarily quiesce write requests from application(s) executing on the virtual machine 206. For instance, in certain embodiments, the VSS service can comprise the VSS service available from MICROSOFT. In certain embodiments, the backup module 222 comprises a driver that communicates with the VSS service on the host server 202 to initiate the service.

The backup module 222 further coordinates with the hypervisor layer 208 of the host server 202 to open an external, hypervisor snapshot 234 on the datastore 204 (e.g., on the SAN) to record changes to the virtual machine disk files during copying and/or backup of the VM_A.VMDK and/or VM_A.VMX files relating to the virtual machine 206. For instance, in embodiments wherein the hypervisor layer 208 comprises an ESX SERVER platform, the hypervisor layer 208 can create a vmsnap of the virtual machine data.

The backup system 200 further includes a backup server 240 for storing the backed-up virtual machine files. For instance, the backup server 240 stores a VM_A backup file 242 comprising a backup of one or more files relating to the virtual machine 206 on the host server 202. In certain embodiments the VM_A backup file 242 comprises a full backup of the entire virtual disk of the virtual machine 206. Moreover, in certain embodiments, the VM_A backup file 242 is advantageously compressed prior to being received by the backup server 240.

In yet other embodiments, the backup system 200 can comprise other types of destination storage devices and/or storage networks for receiving the VM_A backup file 242. For instance, the backup module 222 can cause the VM_A backup file 242 to be stored in the datastore 204, such as in a new technology file system (NTFS) 244 or other location.

Although the backup system 200 has been described with reference to particular arrangements, other embodiments of the invention can differ. For example, the datastore 204 can comprise a virtual machine file system that stores data for a plurality of virtual machines executing on any of the host servers 206, 216 and 217.

Moreover, the management server 220 may further optionally comprise and/or communicate with a preferences database for scheduling the backup of one or more virtual machines. Furthermore, the management server 220 can maintain a catalog or index of backup archives and/or facilitate restore operations with respect to the backup archives.

Figure 3:
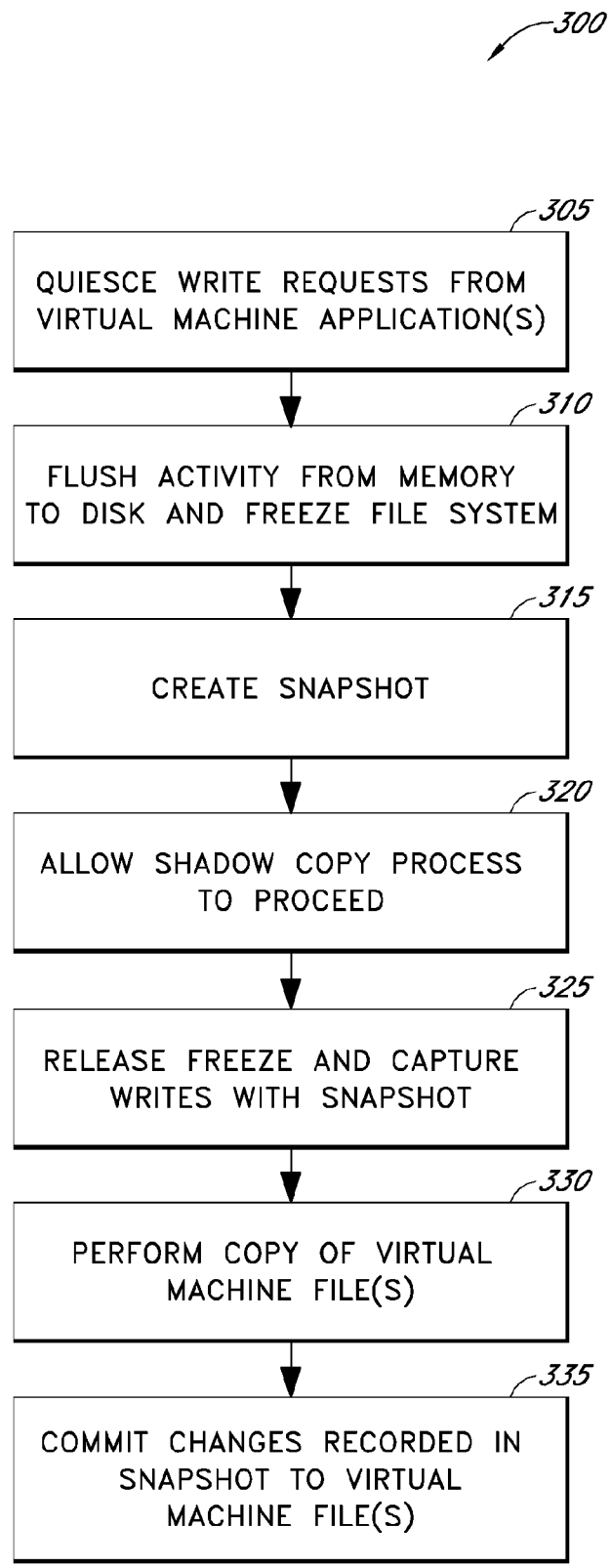
FIG. 3 illustrates a flowchart of an exemplary embodiment of a backup process usable by the backup systems of FIGS. 1 and 2.

FIG. 3 illustrates a flowchart of an exemplary embodiment of a backup process 300 usable by the backup systems 100 and 200 of, respectively, FIGS. 1 and 2 to back up one or more virtual machine files. For exemplary purposes, the blocks of the backup process 300 will be described with reference to the components of the backup system 200 of FIG. 2 and in connection with the backup of the virtual machine 206.

The backup process 300 begins with Block 305 in which write requests from applications running on the virtual machine 206 are temporarily quiesced. In certain embodiments, a shadow copy service (e.g., VSS service 232) installed on the virtual machine 206 and/or host server 202 instructs writers from the virtual machine application(s) to quiesce their data and to temporarily freeze requester I/O write requests.

At Block 310, activity is flushed from memory of the virtual machine 206 on the host system 202 to disk (e.g., to the VM_A.VMDK file 211 on the datastore 204). At that point, the virtual machine file system 210 is frozen to ensure that the file system metadata is written and that the data is written in a consistent order.

At Block 315, the backup module 222 instructs the host server 202 to create a hypervisor snapshot 234 of the virtual machine file system 210. In particular, the hypervisor snapshot 234 provides a means for recording or queuing changes intended to be made to the virtual machine files while the virtual machine files are being backed up. That is, in certain embodiments, creating the hypervisor snapshot 234 allows for the obtaining and/or unlocking of the virtual machine files (e.g., VM_A.VMDK file 211 and/or VM_A.VMX file 212) for backup and prevents changes from being made to the virtual machine files by other applications running on the virtual machine 206. For instance, the virtual machine files may be unlocked with respect to the virtual machine 206 for read-only access by backup tools for performing the requested backup operation.

Once the hypervisor snapshot 234 is created, the shadow copy process 232 is allowed to proceed (Block 320) and to thaw the file system by releasing the application writers from their temporary inactive phase (Block 325). The hypervisor snapshot 234 then houses any additional changes directed to the virtual machine files after the writers are released and during the unlock phase of the virtual machine files. In certain preferred embodiments, the shadow copy process 232 is allowed to proceed concurrently with the maintaining of the snapshot 234 and is structured such that the shadow copy process 232 automatically deletes the generated shadow copy once the copy process 232 has completed.

At Block 330, the host server 202 performs a copy of the virtual machine files obtained from the virtual machine file system 210 and unlocked upon the creation of the hypervisor snapshot 234. In certain embodiments, such copying by the host server 202 includes loading the virtual machine files into memory of the host server 202 and compressing the files prior to writing the files to disk (e.g., as the VM_A backup file 242 to backup server 240). For instance, the backup module 222 and/or management server 220 can instruct processes executing on the host server 202 to read one or more blocks from the virtual machine file(s) for copying, to compress the copied blocks, and to transport the compressed, copied blocks through a pipeline to the intended destination.

In certain embodiments, the backup module 222 and/or management server 220 injects one or more binary files into the host server memory to perform the copy and/or compression processes. In certain preferred embodiments, once the copy and/or compression processes have completed, the injected binary files are removed from the host server 202.

In certain embodiments, the copy process of Block 330 advantageously reduces backup time and/or resources by compressing the backup data in memory prior to being written to disk (e.g., on the backup server 240). For instance, the backup process 300 may comprise taking a 10 GB virtual disk, compressing the backup file in memory, and transmitting the backup file as a 4 GB file to the datastore 204.

As discussed above, during the copy process of Block 330, the virtual machine files are not available for writing with respect to applications running on the virtual machine 206. Rather, the hypervisor snapshot 234 maintains a record of changes directed to the virtual machine files based on write requests and/or data modification operations received from one or more virtual machine applications.

Once the copy process of Block 330 is complete, the changes housed by the hypervisor snapshot 234 are committed to the original virtual machine files (Block 335). In certain embodiments, the backup module 222 causes the host server 202 to execute a committing algorithm to merge the recorded changes to the virtual machine files. For example, in embodiments of the invention operating in an ESX SERVER environment, the VMware application programming interface (API) RemoveSnapshot_Task can be used to commit the changes recorded by the hypervisor snapshot 234. In certain embodiments, the commit algorithms are selected to reduce downtime experienced by the virtual machine 206 while the recorded write operations are being committed to the virtual machine files. Moreover, during the commit phase additional writes received from the virtual machine applications can be temporarily queued until they too are committed to the virtual machine files.

After the writes and/or data modification operations are committed, the virtual machine files are returned to their original state and locked once again for normal access by applications of the virtual machine 206. At this point, the virtual machine files are again available to be written to by the virtual machine applications.

Although the backup process 300 has been described with reference to particular blocks and states, other embodiments of the invention can comprise more or fewer blocks or states. For instance, in certain embodiments, the copying of the virtual machine files (e.g., Block 330) is performed using the VMware Consolidated Backup (VCB) tool in connection with the quiescing services of the VSS service 232. In yet other embodiments, the management server 220 can perform the creation and/or compression of the backup file 242 instead or, or in combination with, the host server 220.

Figure 4A:
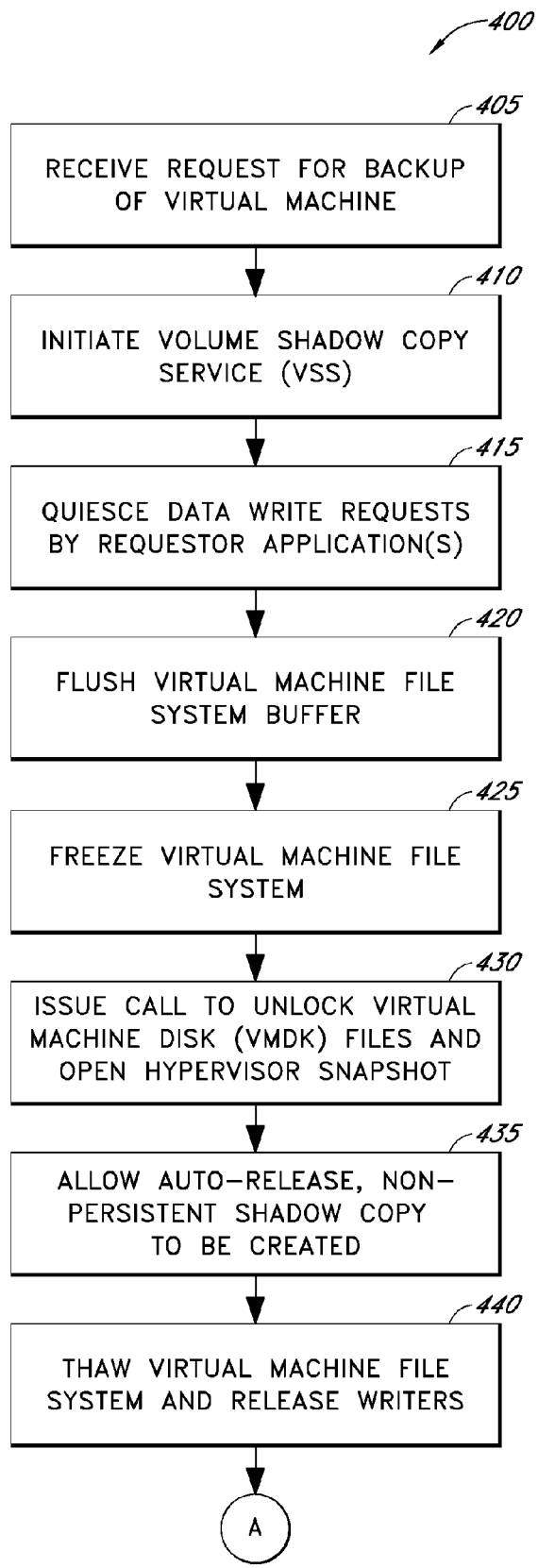
FIGS. 4A and 4B illustrate a flowchart of an exemplary embodiment of a backup process using a shadow copy service that can be performed by the backup systems of FIGS. 1 and 2.
Figure 4A:
Figure 4B:
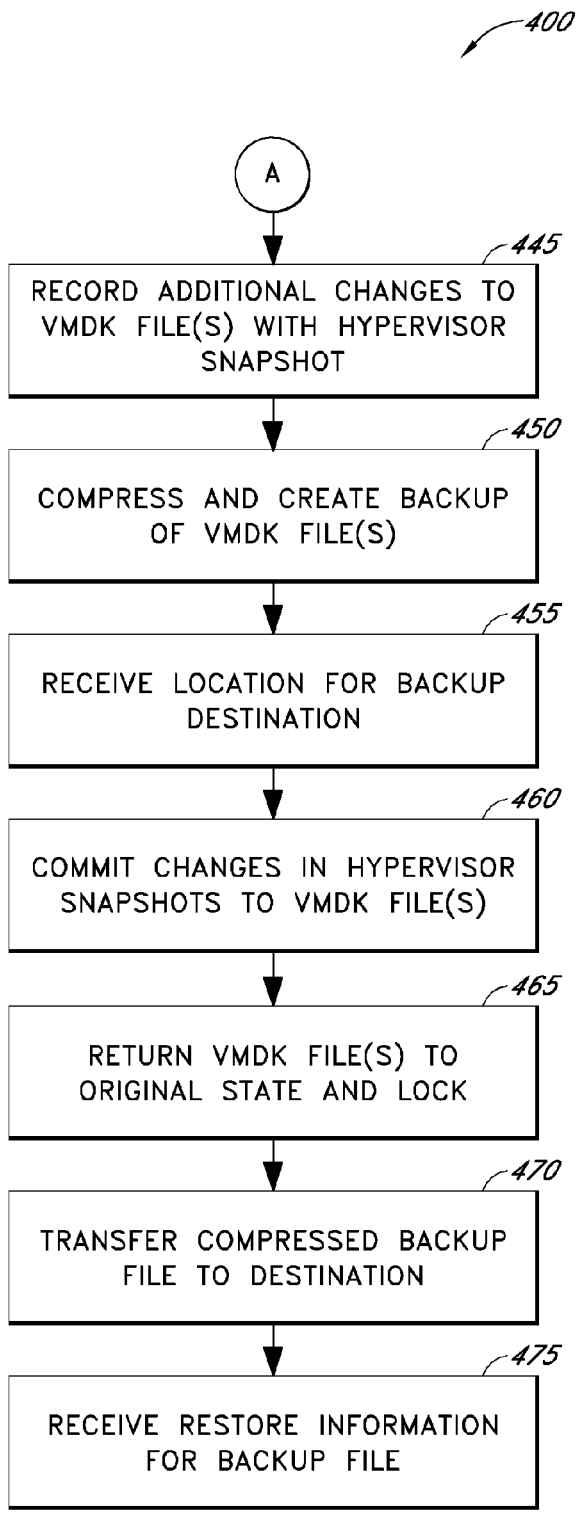

FIGS. 4A and 4B illustrate a flowchart of an exemplary embodiment of a backup process 400 usable by the backup systems 100 and 200 of, respectively, FIGS. 1 and 2. For exemplary purposes, the blocks of the backup process 400 will be described with reference to the components of the backup system 200 of FIG. 2 and in connection with the backup of virtual machine 206. In particular, the backup process 400 will be described with reference to an ESX server environment.

At Block 405, the host server 202 receives a request from the management server 220 to back up the virtual machine 206. In certain embodiments, the request is based on a backup schedule or other retention policy maintained and/or accessed by the management server 220. In yet other embodiments, the backup request is initiated by a user.

At Block 410, the backup module 220 initiates the MICROSOFT VSS service 232 residing on the host server 202. For instance, the backup module 220 can comprise a driver for communicating with and causing the VSS service 232 to enumerate the application writers on the virtual machine 206, gather writer metadata, and prepare the virtual machine 206 for shadow copy creation.

At Block 415, the VSS service 232 temporarily quiesces write requests from applications executing on the virtual machine 206. In certain embodiments, the VSS service 232 causes the application writer(s) to create an XML description of the backup components to the VSS service 232 and also defines the restore method for the writers.

The VSS service 232 also notifies the application writer(s) to prepare their data for making a shadow copy. In certain embodiments, the writer(s) prepare their data in whatever way is appropriate, such as, for example, completing all open transactions, rolling transaction logs, and/or flushing caches. When the data is prepared for shadow copy creation, each writer sends a notification to the VSS service 232.

Upon receiving the notifications from the virtual machine application writers, the VSS service 232 initiates the "commit" shadow copy phase and instructs the application writers to quiesce their data and temporarily freeze any I/O write requests. In certain embodiments, during this process, I/O read requests by the virtual machine applications are still possible since no modification of the virtual machine files occurs.

In certain embodiments, the application freeze is not permitted to last longer than sixty seconds in order to reduce undesired downtime of the virtual machine 206. In other embodiments, the application freeze can be of a longer duration.

During this time, data is also flushed from the buffer memory of the VMFS 210 to disk (Block 420), after which the VMFS 210 is frozen to ensure that file system metadata is written and that the data is written in a consistent order (Block 425).

At Block 430, the backup module 220 issues a call to unlock the virtual machine disk (VMDK) files for read-only purposes and to create the hypervisor snapshot 234 of the VMFS 210. In certain embodiments, the backup module 220 uses a VMware API to instruct a VMware sync driver to open the hypervisor snapshot 234 to create a point-in-time copy of the VMFS 210. Moreover, in certain embodiments, although the VMDK files are unlocked for read-only purposes with respect to the processes performing the backup operation, the hypervisor 208 can retain full read-write access to the unlocked VMDK files.

In certain embodiments, the snapshot 234 comprises a ΔVMDK file or a REDO log for housing subsequent changes directed to the VMDK files during processing. For instance, in an ESX server environment, one or more redo-log files (e.g., VM_A-001.VMDK) can be created automatically by the hypervisor 208 or other module when the virtual machine 206 has one or more corresponding snapshots open. The redo-log file(s) then store changes made to the virtual disk (e.g., VM_A.VMDK) while the virtual machine 206 is still running. For instance, in certain embodiments, the hypervisor 208 redirects any write requests or data modification requests intended for the virtual disk to the redo-log file while the virtual disk is unlocked for backup.

Once the snapshot 234 is generated, the VSS service 232 is allowed to continue to create a non-persistent shadow copy of the VMFS 210. In certain embodiments, the backup module 220 initiates the VSS service 232 in an auto-release mode, thereby ensuring that the created shadow copy will be non-persistent and will automatically delete itself upon completion (e.g., prior to the committing of the changes to the VMDK). Moreover, because the shadow copy is created after the hypervisor snapshot 234 is generated, the backup copy of the virtual machine disk does not include the shadow copy data.

With the snapshot 234 open and ready to house requested changes to the VMDK files, the VSS service 232 thaws the VMFS 210 file system and releases the application writers from their temporary inactive phase (Block 440). Queued write I/Os are then completed.

In certain embodiments, the VSS service 232 can also query one or more writers to confirm that the write I/Os were successfully held during the freeze. If the writes were not successfully held, the VSS service 232 can notify the backup module 220, and the backup process 400 can be aborted and/or restarted.

Once the application writers are released, the snapshot 234 is configured to house any changes directed to the VM_A.VMDK (Block 445) until the changes are committed to the VMDK file and the VMDK file is restored to its original state. As discussed above, in certain embodiments Block 445 comprises the hypervisor 208 redirecting or recording writes received from virtual machine applications to the snapshot 234 file, redo-log file, or like data structure.

At Block 450, while the snapshot 234 is open and housing the changes to the VMDK file, the host server 202 begins compressing and creating a backup of the VMDK file. In certain embodiments, the VMDK file is read into memory in one or more portions and is compressed to eliminate "white space" as well as shrink the data size.

In certain embodiments, the backup module 220 manages the compression process by injecting the compression binary file 226 into the host system 202. As discussed above, performing such compression in memory of the host system 202 substantially reduces the time required to perform the backup operation, as well as reduces resource consumption in performing the backup operation.

In certain embodiments, as the copying and compression is taking place, the compressed backup data is streamed (e.g., through a pipeline configuration) to a backup location, such as the backup server 240, received from the backup module 222 (Block 455). In certain embodiments, the backup location can comprise a WINDOWS or LINUX destination or can comprise a particular VMFS or logical unit number (LUN).

Once compression of the VMDK backup file is complete, the changes recorded by the hypervisor snapshot 234 are committed to the original VMDK file (Block 460). In certain embodiments, the VMware API RemoveSnapshot_Task is used to commit the changes to the VMDK file. In certain preferred embodiments, the committing algorithm is structured to reduce downtime for the virtual machine 206 as the changes are being committed to the VMDK file.

At Block 465, once the changes are committed to the VMDK file, the VMDK file is returned by the host server 202 to its original state and is locked once again for general operation and write access by the virtual machine applications. The backup process 400 then proceeds with Block 470 to complete the transfer of the compressed file to the destination location.

At Block 475, the backup module 222 receives restore information for the VM_A backup file 242. For example, the restore information can be used in a restore process and can include, for example, who performed the backup, compression information, encryption information, list of files, file size information, last modified and/or access times, file metadata, combinations of the same and the like. In certain embodiments, at least a portion of the restore information is received from an administrator in an information file that is associated with the backup file.

Although the backup process 400 has been described with reference to particular blocks and states, other embodiments of the invention can comprise different blocks and/or arrangements. For instance, in certain embodiments, the backup process 400 can be performed without compression and/or with encryption. In yet other embodiments, the hypervisor snapshot 234 can comprise a plurality of snapshot files for recording intended changes to the virtual disk files or other like information while the virtual disk files are unlocked for backup purposes.

FIG. 5 illustrates an exemplary embodiment of a screen display of a backup option window 500 usable with the backup systems 100 and 200 of, respectively, FIGS. 1 and 2. For example, in certain embodiments, the backup option window 500 is communicated through the user interface 228 of the backup system 200.

As shown, the backup option window 500 is configured to receive information from a user and/or administrator to define backup criteria. Such criteria can include, for example, instructions regarding evaluating free space on a destination disk, compression, updating results, varying write speeds, combinations of the same and the like. In particular, the backup option window 500 includes an enable VSS option 550 that can be selected when preparing for a backup operation. In certain embodiments, when the option 550 is selected, the backup system proceeds with using a volume shadow copy service to prepare one or more virtual machines to be backed up, as described in more detail herein.

Although the backup option window 500 is depicted with respect to a particular arrangement, other embodiments of such a window can be used that contain more or fewer options. For example, the backup option window 500 can further include options relating to the performance of other types of backup operations, such as, for example, incremental and/or differential backup operations.

Certain embodiments of the invention can be embodied as methods and systems for practicing those methods. Embodiments of the invention can also be embodied in the form of computer program code embodied in tangible media, such as floppy diskettes, CD-ROMs, hard drives, a thumb drive, DVD-data discs, or any other computer-readable storage medium wherein, when the computer program code is loaded into and executed by a computer, the computer becomes an apparatus for practicing embodiments of the invention. The program code encoded in tangible media creates the means for causing the computer to perform the various steps of such embodiments of the invention. When implemented on a general purpose microprocessor, the computer program code combines with the microprocessor to provide a unique device that operates analogously to specific circuits.

Moreover, certain embodiments of the invention are described above reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing one or more storage operations in a virtual computing environment, the method comprising:
   receiving a request to back up a virtual machine having a guest operating system and being associated with a host server;
   instructing a shadow copy process on the host server to quiesce write requests and to permit read requests of a virtual machine disk file by one or more applications executing on the virtual machine, the virtual machine disk file associated with the virtual machine and maintained in a datastore, the virtual machine disk file locked against access from outside the virtual machine;
   unlocking the virtual machine disk file for read-only access by a backup process executing outside the guest operating system of the virtual machine;
   unlocking the virtual machine disk file for read-write access by a hypervisor layer associated with the host server;
   creating a hypervisor snapshot of the virtual machine disk file associated with the virtual machine;
   following said creating the hypervisor snapshot, allowing write requests to resume by the one or more applications executing on the virtual machine;
   recording, with the hypervisor snapshot, changes intended to be made to the virtual machine disk file based on said resumed write requests;
   creating, via execution of the backup process, a backup copy of the virtual machine disk file without powering down the virtual machine, the backup copy of the virtual machine disk file being created from outside the guest operating system of the virtual machine;
   following said creating the backup copy, committing the changes recorded with the hypervisor snapshot to the virtual machine disk file;
   determining whether the write requests of the one or more applications were successfully quiesced;
   if the write requests were not successfully quiesced, aborting or restarting the backup process; and
   if the write requests were successfully quiesced, locking the virtual machine disk file for normal access by the virtual machine.

2. The method of claim 1, further comprising, prior to said creating the hypervisor snapshot, flushing transactions in a memory of the virtual machine to the datastore.

3. The method of claim 1, further comprising, following said creating the hypervisor snapshot, allowing the shadow copy process to create a shadow copy of virtual machine data.

4. The method of claim 3, wherein the shadow copy is a non-persistent copy of the virtual machine data, and further comprising deleting the shadow copy prior to locking the virtual machine disk file for normal access by the virtual machine.

5. The method of claim 1, wherein said creating a backup copy comprises creating a backup copy of an entire virtual disk of the virtual machine.

6. The method of claim 1, wherein said creating the backup copy is performed by the host server hosting the virtual machine.

7. The method of claim 6, wherein said creating the backup copy further comprises compressing the backup copy prior to storing the backup copy to disk.

8. The method of claim 7, further comprising injecting a binary file into the host server for creating a compression engine for performing said compressing.

9. A system for performing storage operations in a virtualized computing environment, the system comprising:
   a host computer comprising a virtual machine having a guest operating system that accesses resources of the host computer through at least a hypervisor layer;
   a shadow copy module executing on the host computer, the shadow copy module being configured to quiesce write requests of one or more applications executing on the guest operating system of the virtual machine; and
   a management module in network communication with the host computer, the management module being configured to, receive a request to perform a backup copy of one or more virtual disk files of the virtual machine, the one or more virtual disk files locked against access from outside the virtual machine, instruct the shadow copy module to quiesce the write requests of the one or more applications, instruct the shadow copy module to permit read requests of the one or more applications, instruct the host computer to unlock the one or more virtual disk files for read-only access by a backup process executing outside the guest operating system of the virtual machine, instruct the host computer to unlock the one or more virtual disk files for read-write access by the hypervisor layer of the host computer, instruct the hypervisor layer of the host computer to create a snapshot file of the one or more virtual disk files of the virtual machine, the snapshot file being configured to record changes intended to the one or more virtual disk files during copying of the one or more virtual disk files, instruct the host computer to execute the backup process to create a backup copy of the one or more virtual disk files, instruct the host computer to commit to the one or more virtual disk files the changes recorded by the snapshot file during the creation of the backup copy and, thereafter, to allow write access to the one or more virtual disk files by the one or more applications executing on the guest operating system, instruct the shadow copy module to determine whether the write requests of the one or more applications were successfully quiesced, if the write requests were not successfully quiesced, instruct the backup process to abort or restart, and if the write requests were successfully quiesced, instruct the host computer to lock the one or more virtual disk files for normal access.

10. The system of claim 9, wherein the one or more virtual disk files comprises a .VMDK file.

11. The system of claim 9, wherein the one or more virtual disk files comprises a .VMX file.

12. The system of claim 9, wherein the management module further comprises a user interface module for obtaining user input with respect to the creation of the backup copy.

13. The system of claim 12, wherein the user input comprises restore information to be stored with the backup copy of the one or more virtual disk files.

14. The system of claim 9, wherein the hypervisor layer comprises a bare-metal hypervisor.

15. The system of claim 9, wherein the host computer comprises a cluster of host servers.

16. The system of claim 9, further comprising a backup server in network communication with the management module and the host computer for storing the backup copy.

17. The system of claim 9, wherein the snapshot file comprises a plurality of snapshot files.

18. A system for performing storage operations in a virtualized computing environment, the system comprising:

means for hosting a virtual machine having a guest operating system that accesses resources of the hosting means through at least a hypervisor layer;

means for quiescing write requests of one or more applications executing on the guest operating system of the virtual machine; and means for managing a backup of one or more virtual disk files of the virtual machine, said managing means being further configured to, receive a request to perform a backup copy of one or more virtual disk files of the virtual machine, the one or more virtual disk files locked against access from outside the virtual machine, instruct said quiescing means to quiesce the write requests of the one or more applications, instruct said quiescing means to permit read requests of the one or more applications, instruct said hosting means to unlock the one or more virtual disk files for read-only access by a backup process executing outside the guest operating system of the virtual machine, instruct said hosting means to unlock the one or more virtual disk files for read-write access by the hypervisor layer of said hosting means, instruct the hypervisor layer of said hosting means to create a snapshot file of the one or more virtual disk files of the virtual machine, the snapshot file being configured to record changes intended to the one or more virtual disk files during copying of the one or more virtual disk files, instruct said hosting means to execute the backup process to create a backup copy of the one or more virtual disk files, instruct said hosting means to commit to the one or more virtual disk files the changes recorded by the snapshot file during the creation of the backup copy and, thereafter, to allow write access to the one or more virtual disk files by the one or more applications executing on the guest operating system instruct the quiescing means to determine whether the write requests of the one or more applications were successfully quiesced, if the write requests were not successfully quiesced, instruct the backup process to abort or restart, and if the write requests were successfully quiesced, instruct said hosting means to lock the one or more virtual disk files for normal access.

19. The system of claim 18, wherein said managing means further comprises means for injecting binary files onto said hosting means to perform said creation of the backup copy.

* * * * *